United States Patent
O'Riordan et al.

(10) Patent No.: US 9,589,085 B1
(45) Date of Patent: Mar. 7, 2017

(54) SYSTEMS AND METHODS FOR VIEWING ANALOG SIMULATION CHECK VIOLATIONS IN AN ELECTRONIC DESIGN AUTOMATION FRAMEWORK

(71) Applicant: Cadence Design Systems, Inc., San Jose, CA (US)

(72) Inventors: Donald J. O'Riordan, Sunnyvale, CA (US); Keith Dennison, Edinburgh (GB); Vuk Borich, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 79 days.

(21) Appl. No.: 14/559,420

(22) Filed: Dec. 3, 2014

(51) Int. Cl.
    *G06F 17/50* (2006.01)

(52) U.S. Cl.
    CPC ...... *G06F 17/5036* (2013.01); *G06F 2217/04* (2013.01)

(58) Field of Classification Search
    CPC ............. G06F 17/5009; G06F 17/5036; G06F 11/3656
    USPC .................................. 716/106, 136
    See application file for complete search history.

(56) References Cited

U.S. PATENT DOCUMENTS

| | | | |
|---|---|---|---|
| 5,706,494 A * | 1/1998 | Cochrane | .......... G06F 17/30595 |
| 6,591,402 B1 | 7/2003 | Chandra et al. | |
| 6,735,765 B1 | 5/2004 | Schumacher | |
| 7,039,645 B1 | 5/2006 | Neal et al. | |
| 7,574,652 B2 | 8/2009 | Lennon et al. | |
| 8,028,258 B1 * | 9/2011 | Ogami | ................ G06F 17/5068 716/110 |
| 8,145,458 B1 | 3/2012 | Kukal et al. | |
| 8,543,379 B1 | 9/2013 | Michelsen | |
| 8,676,720 B1 | 3/2014 | Neal et al. | |
| 9,032,347 B1 | 5/2015 | O'Riordan | |
| 2003/0104470 A1 | 6/2003 | Fors et al. | |
| 2005/0091199 A1 * | 4/2005 | Focazio | .......... G06F 17/30595 |
| 2005/0149893 A1 | 7/2005 | Roesner et al. | |
| 2005/0234985 A1 * | 10/2005 | Gordon | ............. G06F 17/30781 |
| 2007/0143719 A1 * | 6/2007 | Chopra | ............... G06F 17/5036 716/113 |
| 2009/0024951 A1 * | 1/2009 | Zeringue | ............... G06F 3/0481 715/772 |
| 2009/0100089 A1 * | 4/2009 | Eadon | ............... G06F 17/30595 |

(Continued)

*Primary Examiner* — Paul Dinh
(74) *Attorney, Agent, or Firm* — Andrews Kurth Kenyon LLP

(57) ABSTRACT

A system, method, and computer program product for viewing analog simulation check violations in an EDA framework. Embodiments combine input data tables into a single data table for each check type using SQL inner join operations, create a SQL view of the single data table to list individual check violations, and output the view for user inspection of the corresponding check violations. Embodiments normalize the input data tables to include details of circuit nodes, elements, and paths implicated in the check violations. Additional views combine views of different check types into unified summary tables. Embodiments create a second view to aggregate individual check violations that involve the same circuit objects over time, and output the second view. Output views are self-describing, to enable a single graphical user interface to operate across multiple simulator versions. Metadata tables describe data types presented in various view columns, and user interactions allowed therewith.

20 Claims, 18 Drawing Sheets

(56) References Cited

U.S. PATENT DOCUMENTS

| | | | |
|---|---|---|---|
| 2010/0023481 A1* | 1/2010 | McGoveran | G06F 17/30595 707/E17.005 |
| 2012/0054576 A1* | 3/2012 | Gross | H03M 13/1117 714/752 |
| 2014/0046638 A1* | 2/2014 | Peloski | G06F 17/5009 703/6 |
| 2015/0347501 A1* | 12/2015 | Goshen | G06F 17/30554 707/722 |

* cited by examiner

▼ All Asserts/Checks
▼ All Asserts/Checks
▼ Dynamic Checks
▼ Dynamic Checks (cumulative)
▼ Dynamic Checks (detail)
▼ PSL Asserts
▼ PSL Asserts (cumulative)
▼ SOA Checks
▼ SOA Checks (cumulative)
▼ Static Checks

FIG. 3

Show: ▼ All Asserts/Checks (cumulative)

| CheckName | Type | Expr/InstPath | Count | FirstViolation | CumulativeDuration |
|---|---|---|---|---|---|
| All | All | All | All | | |
| vip_test_Constr_5 | assert | v(inv_out1)-v(inv_out3) | 6 | 0 | 47.7n |
| vip_test_Constr_6 | assert | v(inp)-v(inn) | 6 | 0 | 74.47n |
| vip_test_Constr_1 | dyn_dcpath | 1,0 | 3 | 50.34n | 14.8n |
| vip_test_Constr_3 | dyn_exi | M0 | 3 | 50.35n | 14.71n |
| vip_test_Constr_3 | dyn_exi | M1 | 3 | 50.34n | 14.75n |
| vip_test_Constr_2 | dyn_exrf | vdd! | 3 | 50.53n | 4.426n |
| vip_test_Constr_2 | dyn_exrf | 0 | 2 | 60.23n | 20.62n |
| vip_test_Constr_2 | dyn_exrf | Y | 3 | 50.35n | 14.76n |
| vip_test_Constr_4 | dyn_glitch | I4.N1 | 3 | 50.53n | 2.022n |
| vip_test_Constr_0 | dyn_highz | 0 | 2 | 61.47n | 18.06n |
| vip_test_Constr_0 | dyn_highz | Y | 2 | 65.37n | 9.440n |

| CheckName | Type | ExprInst | Start | Duration |
|---|---|---|---|---|
| vip_test_Constr_6 | assert | v(inp)-v(inn) | 70.31n | 14.91n |
| vip_test_Constr_6 | assert | v(inp)-v(inn) | 90.31n | 9.692n |
| vip_test_Constr_5 | assert | v(inv_out1)-v(inv_out3) | 90.63n | 9.369n |
| vip_test_Constr_1 | dyn_dcpath | 1,0 | 50.34n | 4.933n |
| vip_test_Constr_1 | dyn_dcpath | 1,0 | | |
| vip_test_Constr_1 | dyn_dcpath | 1,0 | | |
| vip_test_Constr_3 | dyn_exi | M0 | | |
| vip_test_Constr_3 | dyn_exi | M1 | | |
| vip_test_Constr_3 | dyn_exi | M0 | | |
| vip_test_Constr_3 | dyn_exi | M1 | | |
| vip_test_Constr_3 | dyn_exi | M0 | | |
| vip_test_Constr_3 | dyn_exi | M1 | | |
| vip_test_Constr_3 | dyn_exf | vdd! | | |
| vip_test_Constr_2 | dyn_exf | Y | | |
| vip_test_Constr_2 | dyn_exf | 0 | | |
| vip_test_Constr_2 | dyn_exf | vdd! | | |

AssertInst: vip_test_Constr_5
Instance:
Message: None
Model:
Expression: v(inv_out1)-v(inv_out3)
MinBound: 111m
MaxBound: 1.222
StartTime: 9.06305e-08
Value: -211.8m
Margin: 322.8m
Duration: 9.369n
EndTime: 100n
EndValue: -1.1
PeakStep: 100n
PeakValue: -1.1
DetailMessage: None Show: All Asserts/Checks Interactive 0

| CheckName | Type | Inst/Net | Start | Duration |
|---|---|---|---|---|
| vip_test_Constr_3 | dyn_exl | M0 | 50.35n | 4.903n |
| vip_test_Constr_3 | dyn_exl | M1 | 50.34n | 4.917n |
| vip_test_Constr_3 | dyn_exl | M0 | 70.35n | 4.903n |
| vip_test_Constr_3 | dyn_exl | M1 | 70.34n | 4.917n |
| vip_test_Constr_3 | dyn_exl | M0 | 90.35n | 4.903n |
| vip_test_Constr_3 | dyn_exl | M1 | 90.34n | 4.917n |
| vip_test_Constr_2 | dyn_exrf | vdd! | 50.53n | 1.475n |
| vip_test_Constr_2 | dyn_exrf | Y | 50.35n | 4.92n |
| vip_test_Constr_2 | dyn_exrf | 0 | 60.23n | 10.31n |
| vip_test_Constr_2 | dyn_exrf | vdd! | 70.53n | 1.475n |
| vip_test_Constr_2 | dyn_exrf | Y | | |
| vip_test_Constr_2 | dyn_exrf | 0 | | |
| vip_test_Constr_2 | dyn_exrf | Y | | |
| vip_test_Constr_4 | dyn_glitch | I4.N | | |

CheckName: vip_test_Constr_2
Node: vdd!
RiseFall: utime
Start: 7.052515e-08
Duration: 1.475n

SYSTEMS AND METHODS FOR VIEWING ANALOG SIMULATION CHECK VIOLATIONS IN AN ELECTRONIC DESIGN AUTOMATION FRAMEWORK

FIELD OF THE INVENTION

This description relates to the field of circuit simulation, and more precisely to viewing errors resulting from analog simulation check and assertion violations.

BACKGROUND

Modern analog circuit simulators produce a plethora of output reports, often in a variety of file formats. Among these are reports of violations of various types of checks and assertions, such as Property Specification Language (PSL) functional assertions, device Safe Operating Area (SOA) assertions, and various implementation related checks such as static checks and dynamic checks of various kinds (e.g., high impedance node checks, excessive rise/fall time checks, etc. as will be described). For purposes of brevity in this description, all such checks and assertions may be simply referred to as "checks" or "asserts", and various problematic results indicative of errors and violations may be simply referred to as "violations". Reports may be written to the primary simulator log file (as one commercial simulator does for its SOA checks), or to "companion" files (e.g., XML files, as one commercial simulator does for its static/dynamic checks).

An analog circuit design environment is responsible for setting up the data and tasks for a given simulator to perform, in addition to allowing the user to efficiently inspect the simulation results, including such output reports, and to debug a circuit design. However, it is a significant burden for the design environment development team to keep up with the various types of files and file formats produced by today's simulators. Modern design environments should ideally be able to easily cross reference items cited in the various output reports back to the schematic database from which the circuit netlist is derived, to facilitate debugging. The differences in simulator output file formats make this task difficult.

Further, each individual type of check supported by the simulator has historically come with its own dedicated graphical user interface (GUI) for inspecting the results of that check. The resulting design environment may often appear non-uniform and disorganized. Basic interaction tasks that users learn for interacting with the check violation data do not usually map across the different types of checks and supported GUIs, therefore increasing the users' cognitive workload. As new checks are added to an often rapidly evolving simulator, the design environment can often "fall behind" due to being on different release schedules. The result may be that no design environment user interface may exist at all for newer checks until quite some time after the simulator has been released. Without such user interfaces, users usually have to resort to manually viewing simulator log files and other inefficient methods of managing simulator output.

Thus, there is a need for an improved approach to viewing and understanding analog simulation check and assertion violations and related errors in a design environment. Accordingly, the inventors have developed a novel way to help circuit designers and design tool vendors address this issue.

BRIEF DESCRIPTION OF THE DRAWINGS

FIG. 3 is a diagram of a summary view 300, according to an embodiment.

FIG. 6 is a diagram of a view 600 of all individual check violations, according to an embodiment.

FIG. 7 is a diagram of a view 700 of all individual dynamic check violations, according to an embodiment.

DETAILED DESCRIPTION

Figure 1:
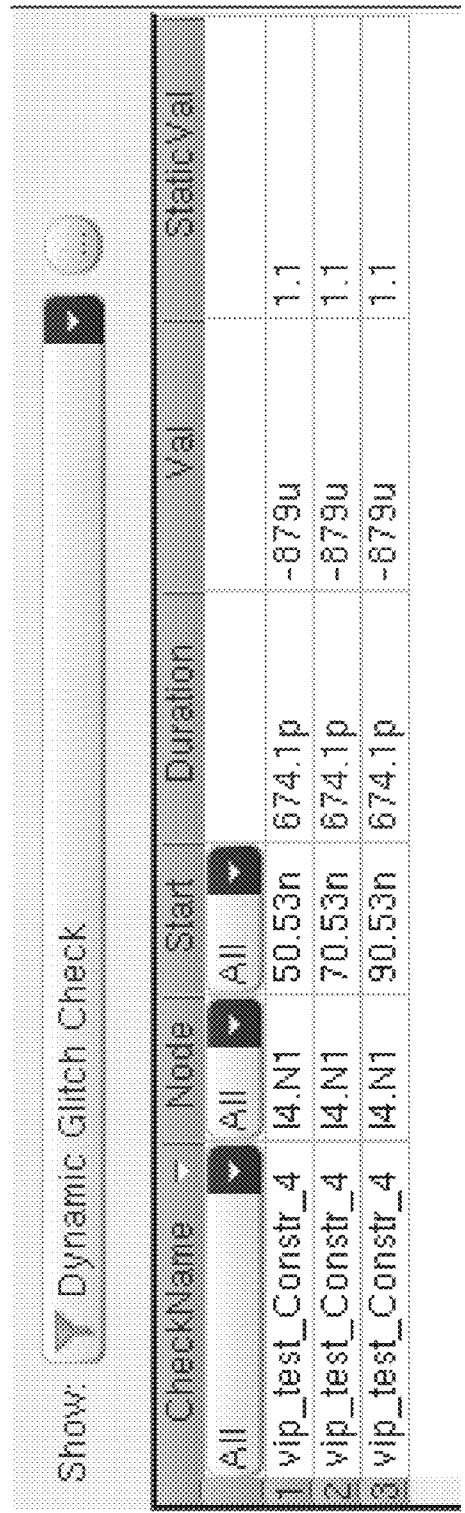
FIG. 1 is a diagram of a detail view 100 listing individual check violations, according to an embodiment.

This description presents a system, method, and computer program product for viewing errors resulting from analog simulation check and assertion violations in an analog circuit design environment. Embodiments may provide a uniform approach to viewing analog simulator circuit check/assertion/safe operating area violations, which is both easy to use and high in performance. Embodiments may handle many circuit check types, and may provide the ability to view violation data at multiple levels, that is, with both high-level dashboard/summary views and the ability to "drill down" for more detail. The approach provided can scale to new types of checks coming online as analog circuit simulators increase in sophistication. The output data produced by the simulator may be organized and structured to facilitate the creation of an improved analog circuit design environment. The violation data may be transformed into a self-describing format to enable an analog simulation environment development team to produce a single user interface that can operate across multiple simulators and/or simulator versions. A single data file to store all the violations avoids the need for the design environment to track multiple versions of multiple different files across a user's file system.

The approach described may create a uniform GUI based on a hierarchical, self-describing database schema. A new simulator-supported database may contain multiple tables and views, some of which are private (that is, low level, not intended to be directly viewed by the analog simulation design environment user), and others are intentionally public. Embodiments may complement the simulator-generated checks and assertions error violation tables with additional public metadata tables (primarily intended for the environment's use) that present two major categories of information:

(i) A description of which of the remaining tables in the database are public (that is, intended to be presented to the design environment user).

(ii) A description of the types of data (such as instance, net, etc.) represented in the various columns for these public tables, so that the design environment knows how to let the user interact with them. For example, for a column designated of type "node", the environment may create hyperlinks on the node names in the design environment's spreadsheet viewer which, when clicked upon, may highlight the corresponding circuit node in the appropriate design schematic.

Embodiments may further create multiple database views (that is, virtual tables) which perform various data aggregation tasks, allowing the design environment to produce tabular/spreadsheet like reports in dashboard summary form. The produced reports may include additional hyperlinks that the user may click on to "drill down" to lower levels of detail.

Embodiments may further create two parallel sets of tables, one set designed for looking at individual violations, and the second set designed to aggregate violations of the same assertion by the same device across multiple time-based occurrences. The second set thus enables absolute or percentage-based "cumulative" violation times to be inspected by the user. By using Structured Query Language (SQL) aggregation functions for these cumulative aggregation tasks, embodiments may spare the simulator engine from the need to track this data itself, thereby significantly reducing its overhead and complexity. Such cumulative tracking functionality is required since numerous violation types may be tolerable for short intervals, but not tolerable if excessively repeated during a longer overall simulation interval.

In one embodiment, the database comprises a relational database, and the schema uses SQL's VIEW constructs to build up a set of views or virtual tables for display in the design environment from the "raw" lower level SQL tables generated by the simulator at runtime. These lower level tables may first be normalized for higher performance, including for example the addition of extra tables not just for the violations themselves, but for the details of the circuit nodes, elements, and paths which are implicated by the violations. At the bottom level, embodiments may use SQL's INNER JOIN operations to combine the normalized table data (which may be generated by the simulator at runtime) into a single table for each check type. (Inner joins generally create a new result table by combining column values of two input tables according to a specified join predicate. A query compares each row of the two inputs tables to find all pairs that satisfy the predicate. Non-NULL column values for each matched pair of rows are combined into a result row.) Two views may exist for each type of check at this level: one listing individual violations, and one that aggregates the same violation involving the same circuit objects across time.

FIG. 1 shows a diagram of an exemplary detail view 100 that lists individual check violations in detail, according to an embodiment. In this case, a dynamic glitch check is depicted, which reports undesirable signal spikes that violate a check named vip_test_Constr_4 occurring at a given node (I4.N1) at three various times (50.53 nsec, 70.53 nsec, and 90.53 nsec). As will be explained later, this diagram describes a view referred to as dyn_glitch_detail.

Above this layer, embodiments may create additional SQL views that may combine the views of different check types or classes into unified tables, culminating in a single top-level table that lists violations of all types. For these summary (versus detail) views, there may again be two parallel structures: one for individual violations, and one for aggregated violations.

Figure 2:
FIG. 2 is a diagram of a drop-down GUI widget 200, according to an embodiment.
Figure 4A:
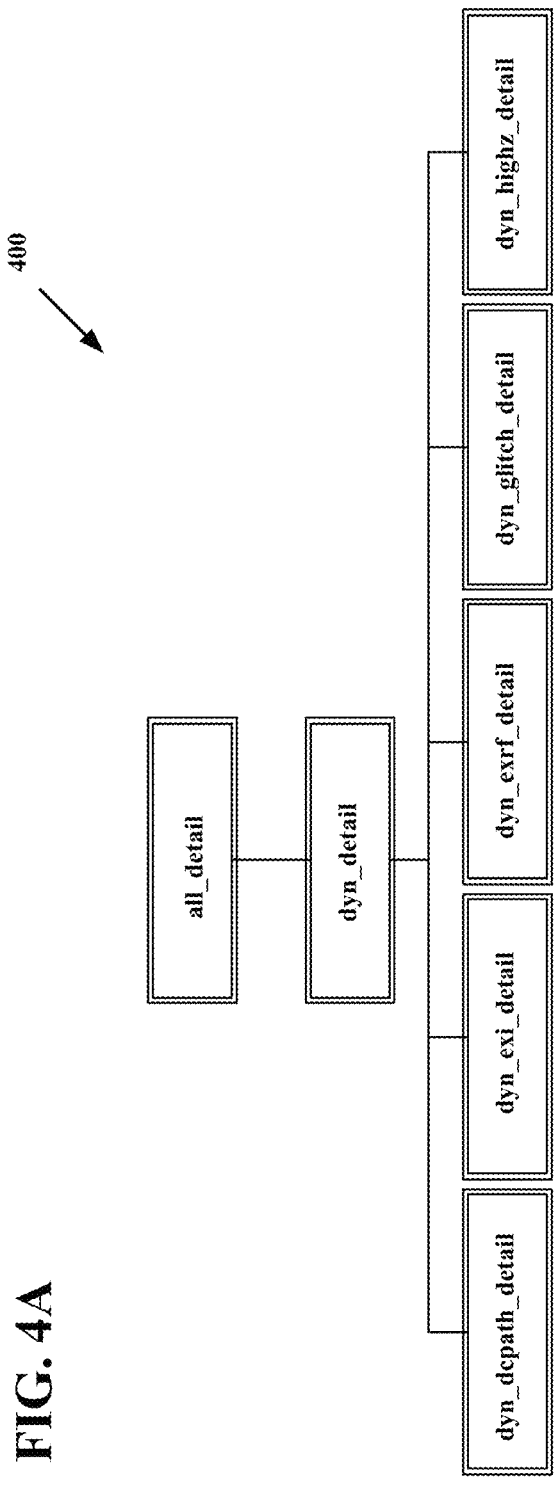
FIGS. 4A-4F are diagrams of a table hierarchy 400 for dynamic checks, for individual check violations, according to an embodiment.
Figure 4B:
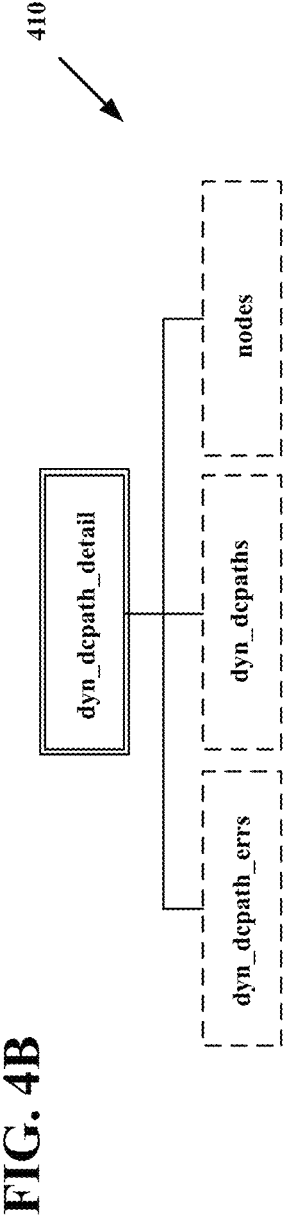
Figure 4C:
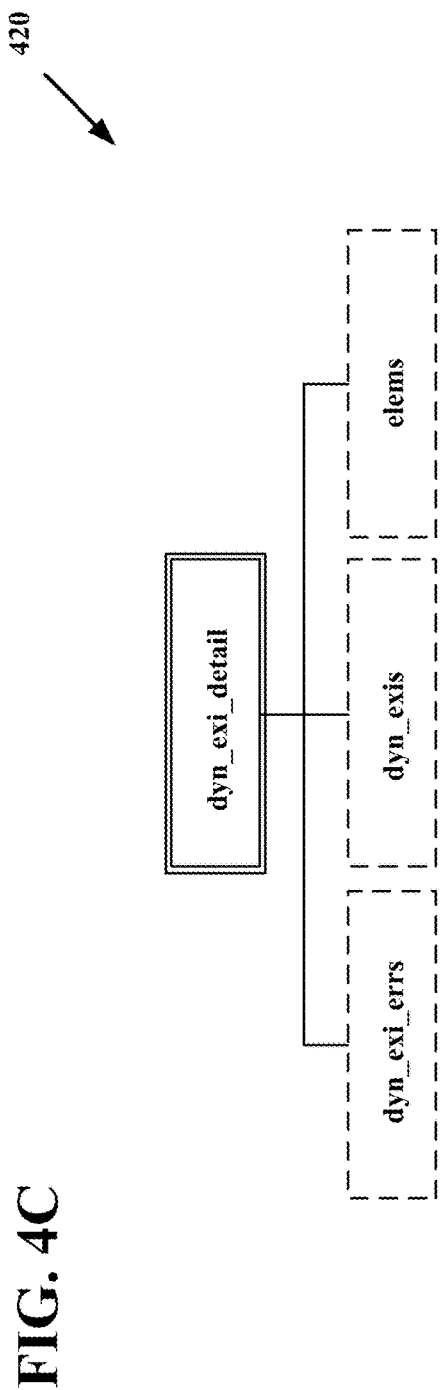
Figure 4D:
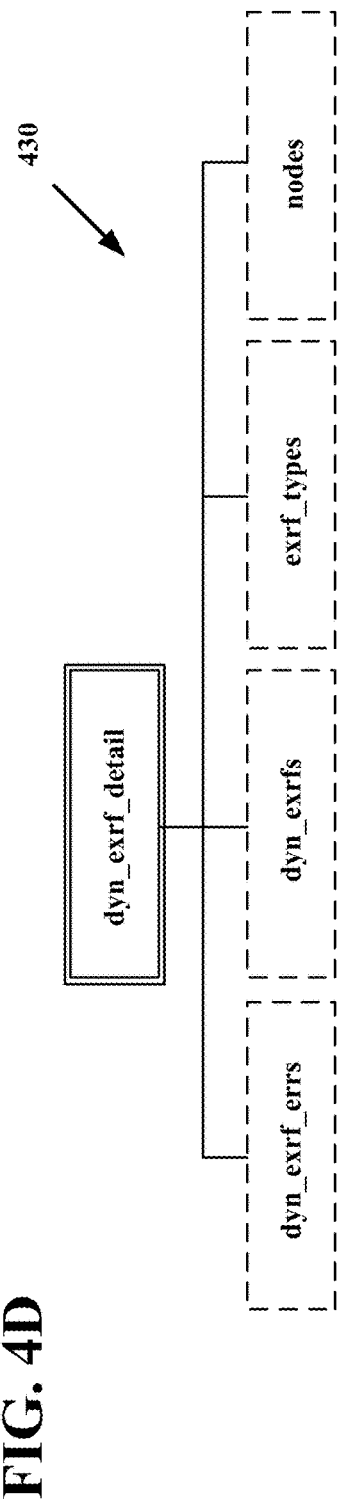
Figure 4E:
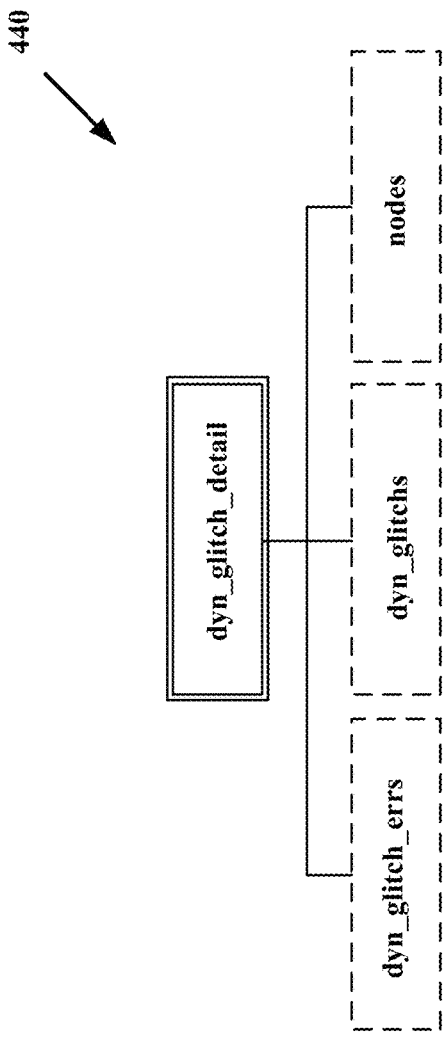
Figure 4F:
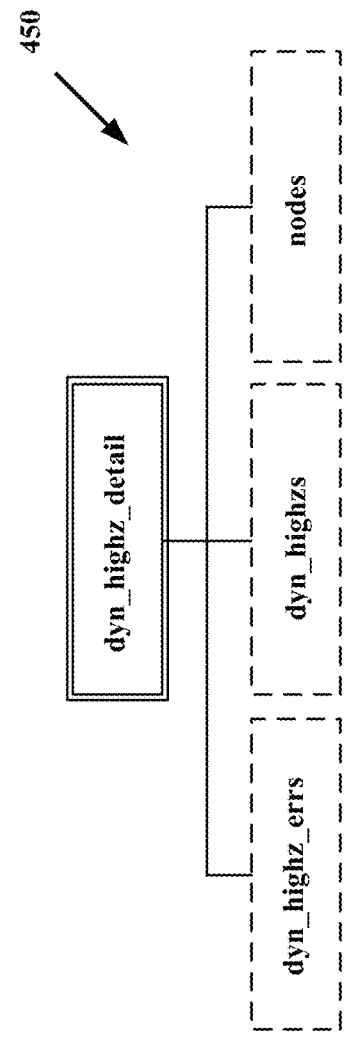

FIG. 2 shows a drop-down GUI widget 200 that presents a number of available views for user selection, according to an embodiment. These public SQL views may be presented to the user by the design environment as shown or via any other GUI widgets as may be known in the art. In this example, a user has selected a table that may then be presented in a spreadsheet-like tabular view below the drop-down widget.

Column-value-based filters may be automatically generated and associated with certain columns of the spreadsheet-like tabular view to allow filtering based on those column contents. Column headers may be clicked on to sort columns in ascending or descending content order.

Metadata may describe at least some of the columns in the various tables. Thus, for example the design environment knows that the "Node" column in FIG. 1 contains circuit schematic nodes. These may then be presented as clickable hyperlinks (such as the value I4.N1 shown in the Node column of FIG. 1) which, when clicked upon, may lead to a specific action. In the case of circuit nodes, the corresponding circuit node may be located and highlighted within the appropriate circuit schematic.

FIG. 3 shows a diagram of an exemplary summary view 300 that shows all violation instances in a condensed form, according to an embodiment. This diagram shows for example on line 9 the vip_test_Constr_4 check of FIG. 1, along with the type of check (dyn_glitch, explained below), and the expression, instance, or net being evaluated or monitored (node I4.N1 in this case). The summary view 300 shows a count of the violations (3 in this case) instead of the details of each individual violation as in FIG. 1. The summary view 300 also provides the time when the first violation occurred (50.53 nsec), along with the cumulative duration of the three violation events (2.022 nsec). As will be explained later, this diagram describes a view referred to as "all_summary".

For dynamic circuit checks, there may be three levels of SQL views in total:

(i) The bottom level that lists only the violations of a particular dynamic check, e.g., dyn_highz.

(ii) Above the bottom level, a view that combines all the different types of dynamic check into a single table of dynamic check violations.

(iii) At the top, an overall dashboard view that combines the single table of dynamic check violations with the simulator assert SOA check violations.

For simulator assert SOA checks there may be two levels of views:

(i) The bottom level that lists only SOA check violations.

(ii) The top level that combines the SOA check violations with all the dynamic violations. Note, this top level dashboard level may be shared with the dynamic checks.

For brevity, this description illustrates the schema and metadata for a limited subset of checks. It will be apparent to one of ordinary skill in the art how this methodology may scale to encompass further types of checks (such as PSL checks) either already supported by or soon to be supported by the simulator. The types of checks described herein include:

(i) Simulator asserts for SOA checks.

(ii) Dynamic circuit checks.

Dynamic circuit checks may comprise these exemplary and non-limiting types:

(i) dyn_dcpath (identifies substantial current-carrying DC leakage paths), (ii) dyn_exi (identifies circuit devices in which excessive current flow is detected), (iii) dyn_exrf (identifies circuit nodes with excessive rise and fall times), (iv) dyn_glitch (identifies circuit nodes undergoing undesirable glitches), and (v) dyn_highz (identifies circuit nodes which are in a high impedance state for a duration longer than a user-defined threshold).

Note that in many database implementations, SQL views (that is, virtual tables) may be executed on demand, and thus do not require any additional storage apart from the query used to generate the view itself. This feature may help to keep the database file size small.

The following sections show the relationships between each table in the schema:

(i) Tables shown with double borders have metadata attached, and represent the public tables, which may be visualized in the design circuit design environment. These tables may be generated by the simulator immediately prior to run time, or at any time thereafter.

(ii) Tables shown with dashed borders represent private tables, that is, the raw violation data generated by the simulator at run time, as it detects violations, e.g., during a transient simulation interval. These tables may not be directly viewable in the design environment.

FIGS. 4A-4F show diagrams of a table hierarchy 400 for dynamic checks, for individual check violations, according to an embodiment. Tables in this section have the suffix "_detail" to indicate that they list the individual detailed violations of a check.

Dynamic checks may be visible to users at three different levels of tables:

(i) The "all_detail" table which lists all assert/check violations in a single table.

(ii) The "dyn_detail" table which lists all dynamic check violations.

(iii) The various "dyn_<checkname>_detail" tables 410-450 in FIGS. 4B-4F, which each list only the violations for a particular dynamic check (e.g. dyn_dc_path_detail, dyn_exi_detail, etc). Each of these tables may refer to private tables providing additional information regarding involved violations and/or errors, types, and nodes and/or elements, and the actual check definitions themselves.

Figure 5:
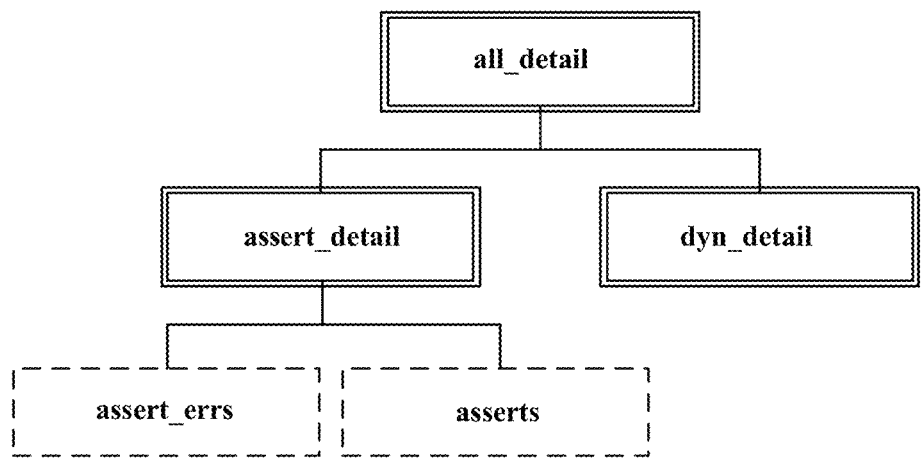
FIG. 5 is a diagram of an overall table hierarchy 500 for individual check violations, according to an embodiment.
Figure 8A:
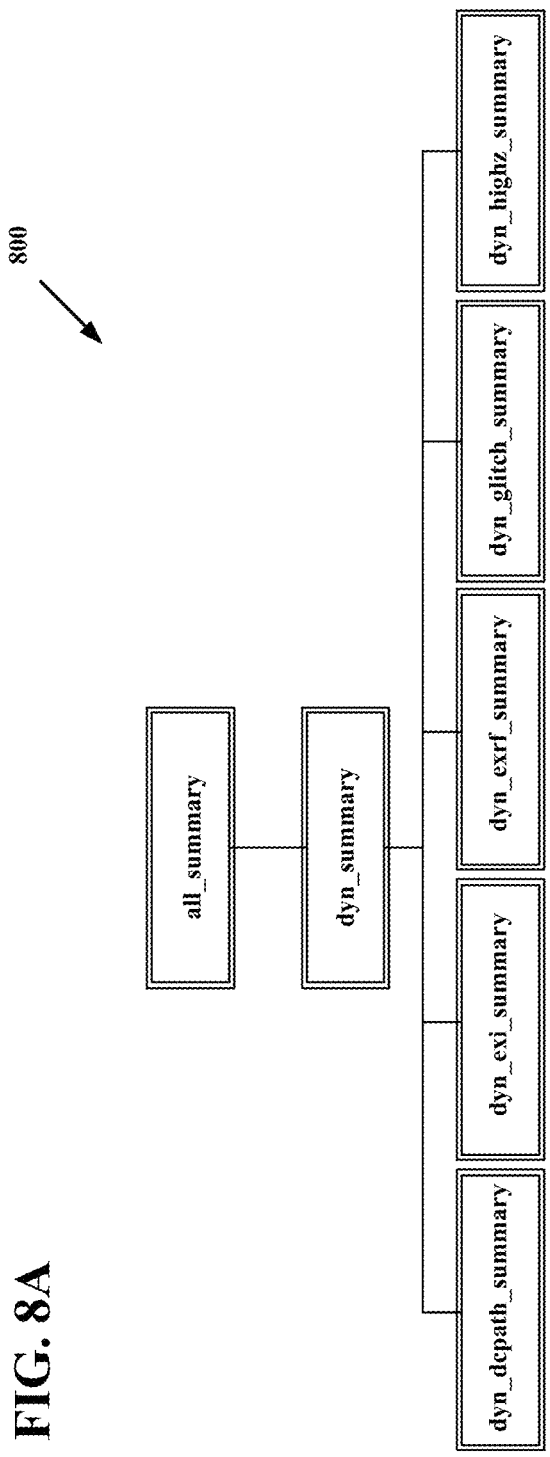
FIGS. 8A-8F are diagrams of a table hierarchy 800 for aggregated dynamic check violations, according to an embodiment.
Figure 8B:
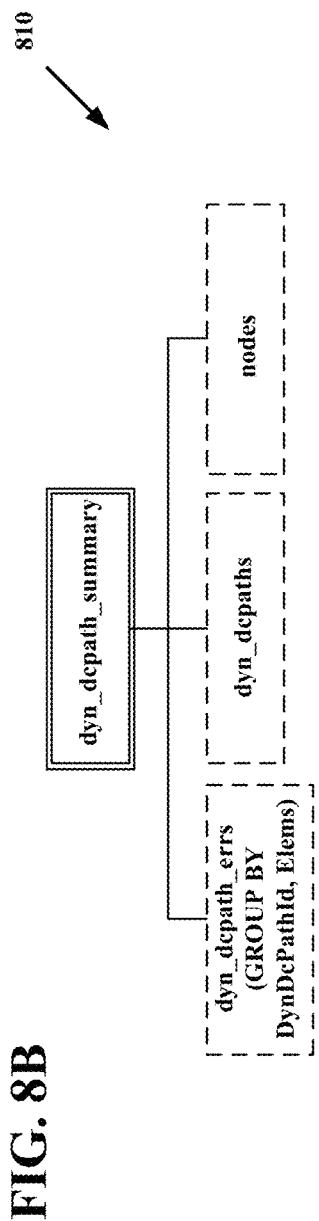
Figure 8C:
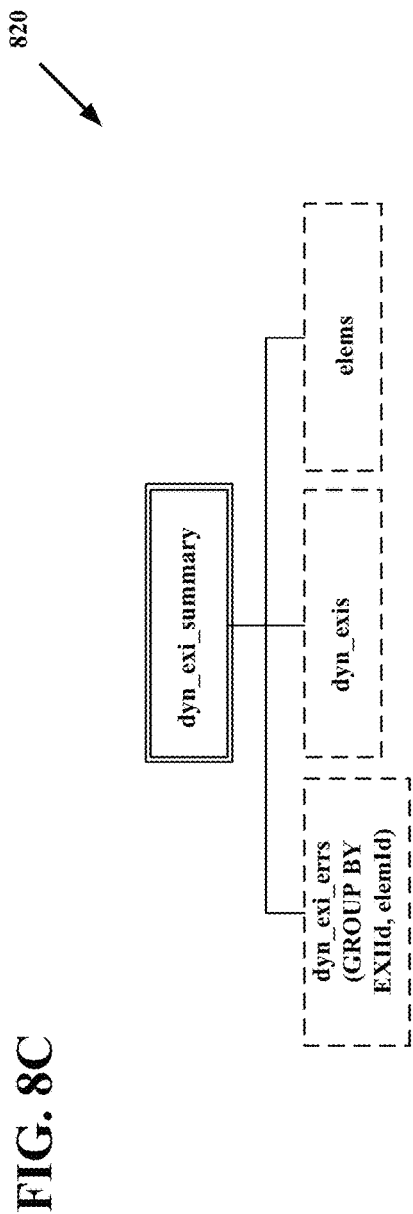
Figure 8D:
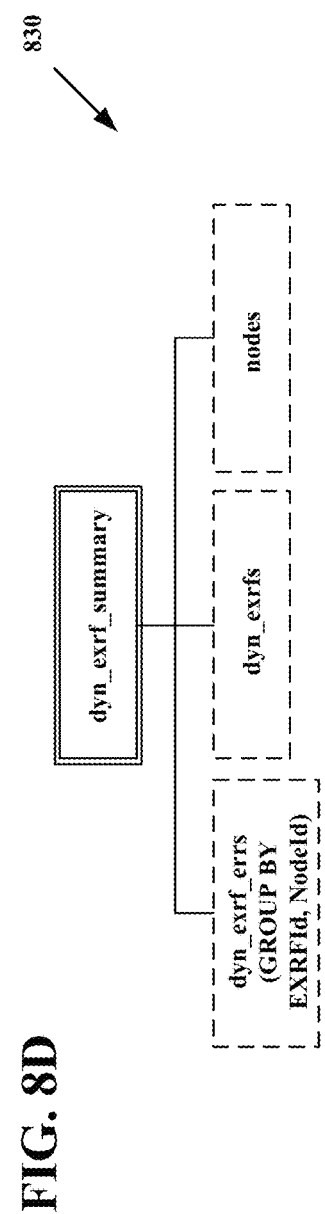
Figure 8E:
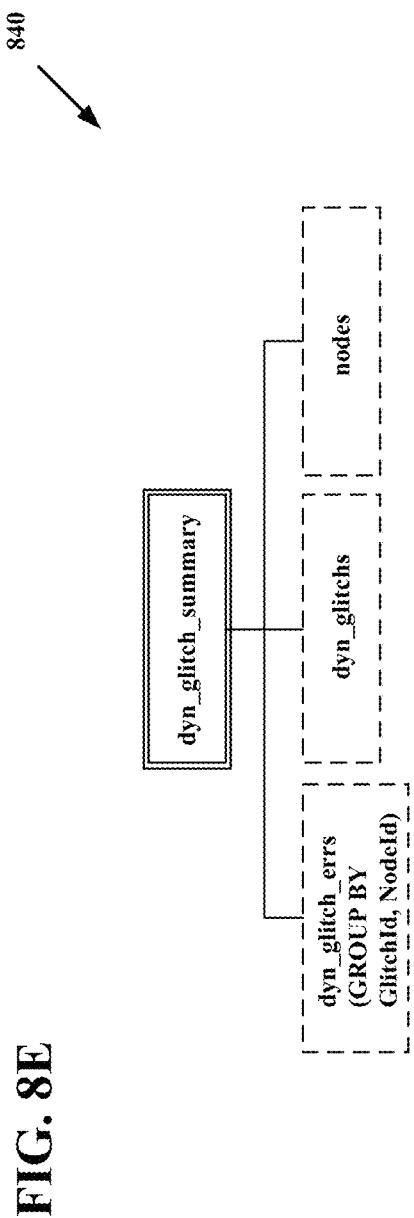
Figure 8F:
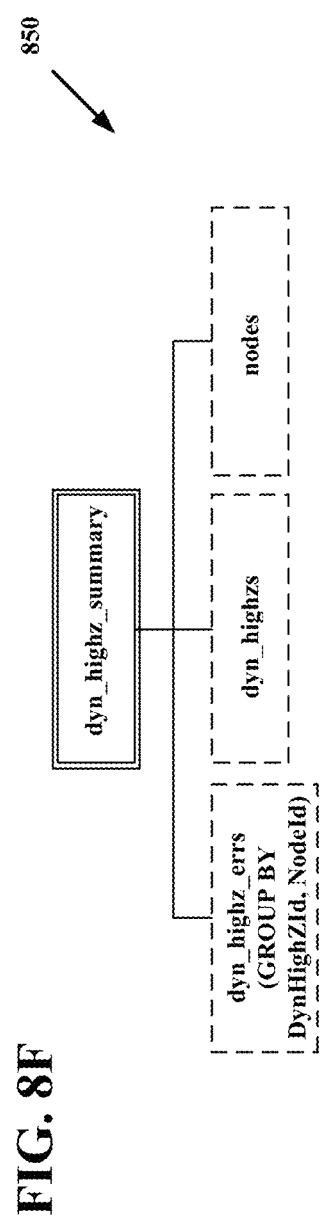

FIG. 5 shows a diagram of an overall table hierarchy 500 for individual check violations, according to an embodiment. The "all_detail" table refers not only to the dyn_detail table previously described, but also refers to the "assert_detail" table that contains public (that is, user-visible) information regarding the various assertions (a different type of check than the 'dynamic' checks) in the circuit design. Private tables such as the "assert_errs" and "asserts" tables may provide additional information regarding the assertions.

FIG. 6 shows a diagram of a view 600 that describes all of the individual check violations, according to an embodiment. This view corresponds to the "all_detail" table described above. Each individual check violation is presented as a row in the table. Columns may describe the name of the check that was violated, its type, and the expression or instance or network involved. For example, for the entry on row 12, the name of the check is "vip_test_Constr_5", the type of check is "assert", and the expression/instance/net involved in the violation is "v(inv_out1)–v(inv_out3)". Here, the expressions, instances, and nets from different types of checks have been combined into a single column ("Expr/Inst/Net") for more uniform presentation. The start time and the duration of this particular violation may also be shown in columns; in this case the values are 90.63 ns and 9.369 ns, respectively.

There is only limited data available for each type of check directly in the all_detail table, but in one embodiment a tool tip may be displayed as shown to provide full details of a particular violation. When a user hovers a cursor over a particular violation row, for example, the embodiments may call on the metadata tables within the database, which help identify the lower level SQL table and row required to generate the full details of the violation, which are then presented in the tooltip. In this case, the lower level table is the "Details" table for SOA check violations of FIG. 4A.

FIG. 7 shows a diagram of a view 700 that describes all of the individual dynamic check violations, according to an embodiment. This view corresponds to the dyn_detail table described above. The table used for viewing all "Dynamic Check" violations here is similar to the "All Asserts/Checks" table used for the view of FIG. 6, and uses the same kind of table navigation, e.g., using the metadata to generate tooltips for each row. This uniformity may aid the user in managing the information needed to debug a design.

Like FIG. 6, each individual dynamic check violation may be presented as a row in the table, and columns may describe the name of the dynamic check that was violated, its type, etc. The check-specific tables may however offer more customized columns to the user. For example, FIG. 1, which is a view of the dyn_glitch_detail table, provides not only the check name, the relevant node, the violation start time and duration, but also the additional check-specific "Val" and "StaticVal" columns that provide relevant voltage values. The finer detail provided by such views and underlying tables may help a circuit designer who wants to "drill down" and find out more precisely what problems appeared during simulation.

FIGS. 8A-8F show diagrams of a table hierarchy 800 for aggregated check violations, according to an embodiment. Tables in this section have the suffix "_summary" to indicate that they list the violations aggregated across time. These summary tables may help provide a more condensed, intuitive view of the various violations for a circuit designer.

As with the individual violations, dynamic checks for aggregated violations may be visible to users at three different levels of tables:

(i) The "all_summary" table which summarizes all aggregated assert/check violations in a single table.

(ii) The "dyn_summary" table which lists all aggregated dynamic check violations.

(iii) The various "dyn_<checkname>_summary" tables 810-850 in FIGS. 8B-8F, which each list only the aggregated violations for a particular dynamic check. Each of these tables may refer to private tables providing additional information regarding involved violations and/or errors, types, and nodes and/or elements.

Aggregation may be achieved using SQL's GROUP BY construct as shown in the various dyn_<checkname>_summary view SQL queries. The time of the first violation, the cumulative violation time, and the violation counts for each group may be calculated using aggregate SQL functions (MIN, SUM, COUNT).

Figure 9:
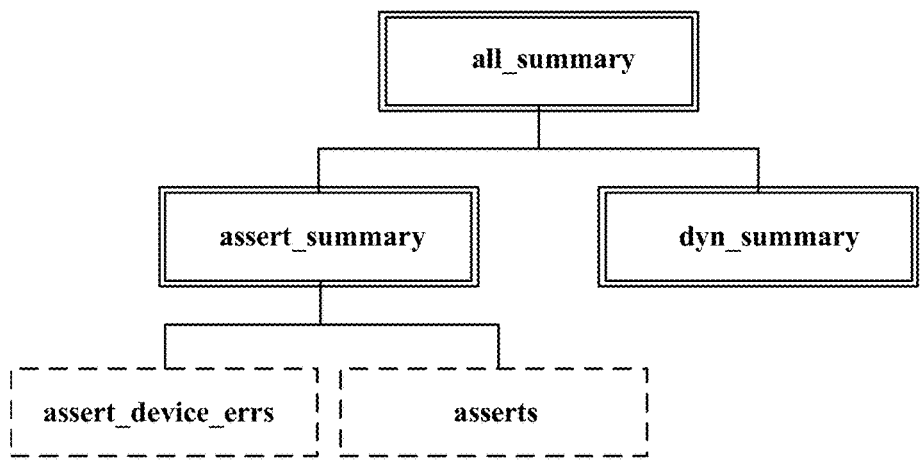
FIG. 9 is a diagram of an overall table hierarchy 900 for aggregated check violations, according to an embodiment.

FIG. 9 shows a diagram of an overall table hierarchy 900 for aggregated check violations, according to an embodiment. The "all_summary" table refers not only to the dyn_summary table previously described, but also refers to the "assert_summary" table that contains public (that is, user-visible) information regarding the various assertions in the circuit design. Private tables such as the "assert_device_errs" and "asserts" tables may provide additional information regarding the assertions.

Figure 10:
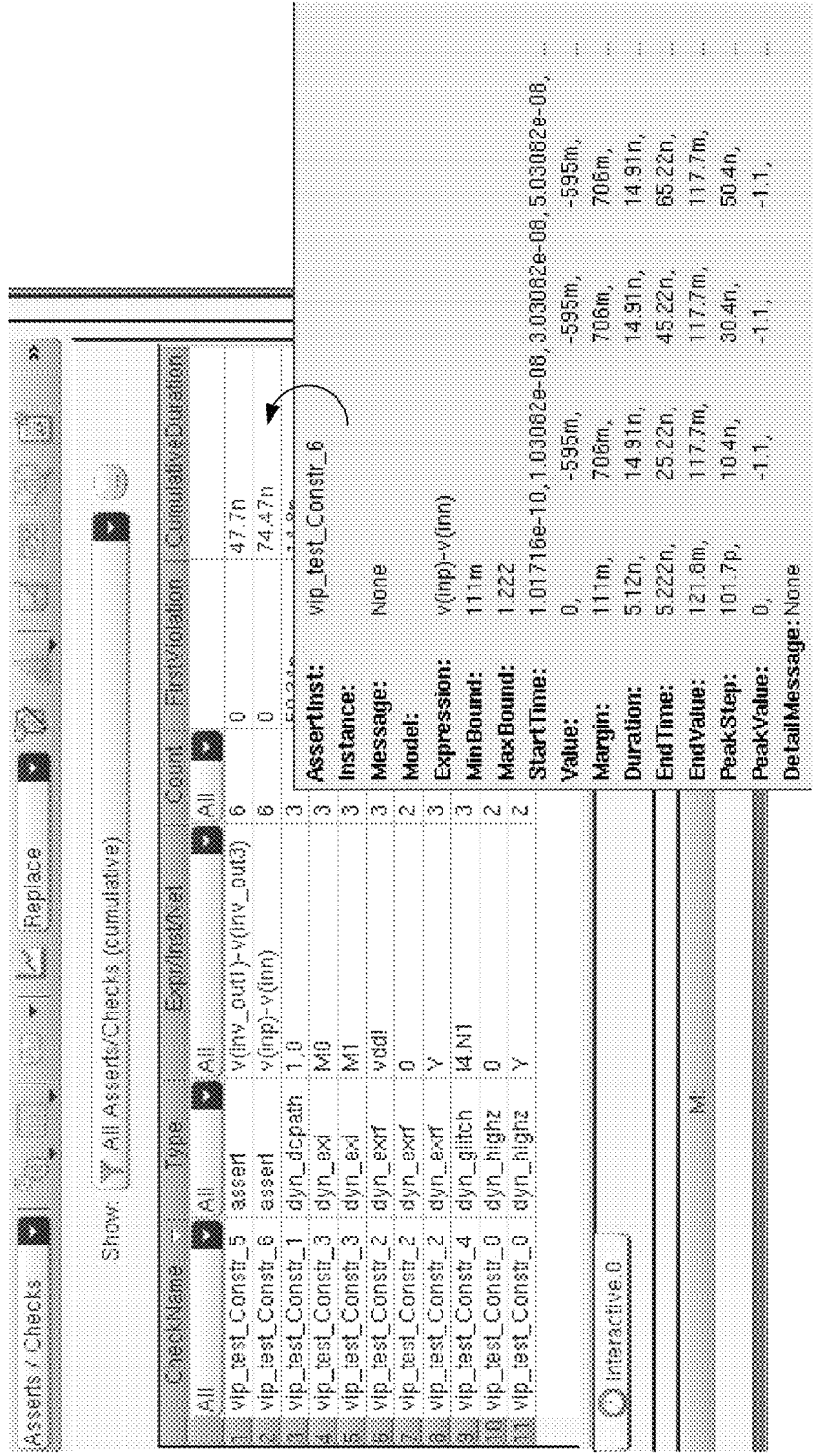
FIG. 10 is a diagram of a view 1000 of all aggregated check violations, according to an embodiment.

FIG. 10 shows a diagram of a view 1000 that describes all of the aggregated check violations, according to an embodiment. This view corresponds to the all_summary table described above. Each aggregated check violation is presented as a row in the table. Columns may describe the name of the check that was violated, its type, and the expression or instance or network involved. For example, for the entry on row 2, the name of the check is "vip_test_Constr_6", the type of check is "assert", and the expression/instance/nets involved in the violation is "v(inp)–v(inn)". Here, the expressions, instances, and nets from different types of checks have again been combined into a single column ("Expr/Inst/Net") for more uniform presentation. Instead of the individual start times and the durations of each particular violation, a count (6 in this case) of the violation occurrences may be shown, along with the first violation time and a cumulative duration of the violation; in this case the values are 0 ns and 74.47 ns, respectively.

There is only limited data available for each type of check directly in the all_summary table, but in one embodiment a tool tip may be displayed as shown to provide full details of a particular aggregated violation. When a user hovers a cursor over a particular aggregated violation row, for example, the embodiments may call on the metadata tables within the database, which help identify the lower level SQL table and row required to generate the full details of the aggregated violation, which are then presented in the tooltip.

Figure 11:
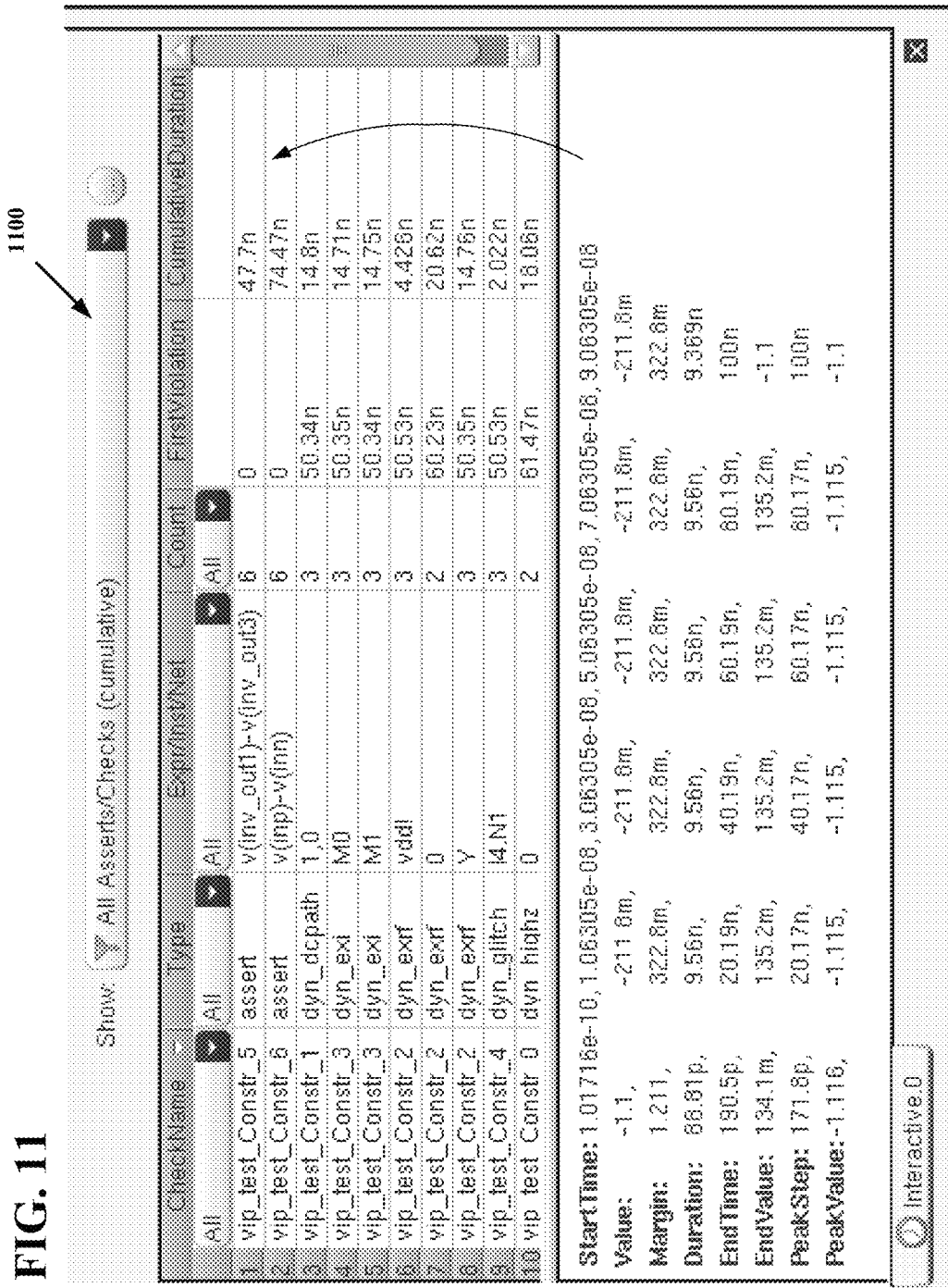
FIG. 11 is a diagram of a view 1100 of all aggregated check violations after a table row has been selected, according to an embodiment.

FIG. 11 shows a diagram of a view 1100 of all aggregated check violations after a particular row in the table has been selected, according to an embodiment. In this embodiment, a user may select row "2" in the table of FIG. 10 to inspect finer detail of the individual check violations. The result in one embodiment is that the full set of individual violations corresponding to the selected row may be provided in a panel that may open beneath the table, as shown.

Figure 12:
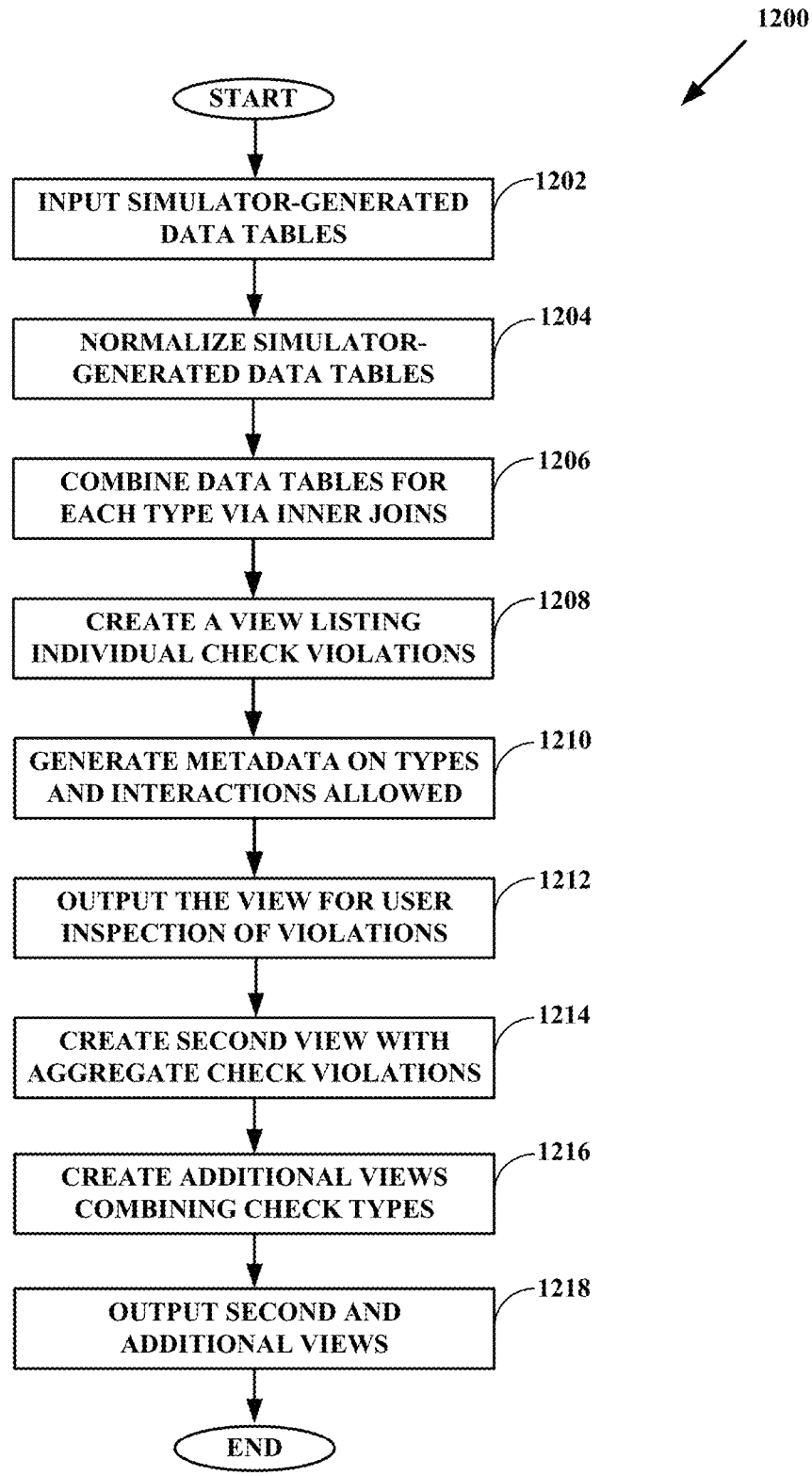
FIG. 12 is a flowchart of a process 1200 for viewing analog simulation check violations in an electronic design automation framework, according to an embodiment.

FIG. 12 shows a flowchart of a process 1200 for viewing analog simulation check violations in an electronic design automation framework, according to an embodiment. At 1202, simulator-generated output tables may be input. These tables may be contained in various log files and other reports, and in various file formats, according to the particular simulator or simulator version selected by a user, who is typically a circuit designer. At 1204, embodiments may normalize the simulator-generated data tables to include details of circuit nodes, elements, paths implicated in the check violations. This step may be optional, depending on whether a particular simulator or simulator version already coherently incorporates those details in its normal output files or reports. At 1206, the simulator-generated data tables may be combined into a single data table for each check type using for example SQL's inner join operations.

At 1208, embodiments may create a view of the single data table to list individual check violations. The view (and any other view that may be created) may be self-describing, to enable a single GUI to operate across multiple simulators and/or simulator versions. At 1210, embodiments may generate metadata tables that describe the types of data presented in various view columns and the allowed user interactions. At 1212, embodiments may output the view for user inspection of the corresponding check violations. The user interface may enable filtering and sorting of view columns according to view column contents.

At 1214, embodiments may create a second view of the single data table to aggregate individual check violations that involve the same circuit objects over time. At 1216, embodiments may create additional views that combine views of different check types into unified summary tables. The second and additional views may be output at 1218.

Appendix 1 of this description provides exemplary SQL code for implementing one embodiment of the invention using an SQL database. Appendix 2 of this description provides exemplary XML code for implementing a different embodiment of the invention that instead uses an XML database.

Figure 13:
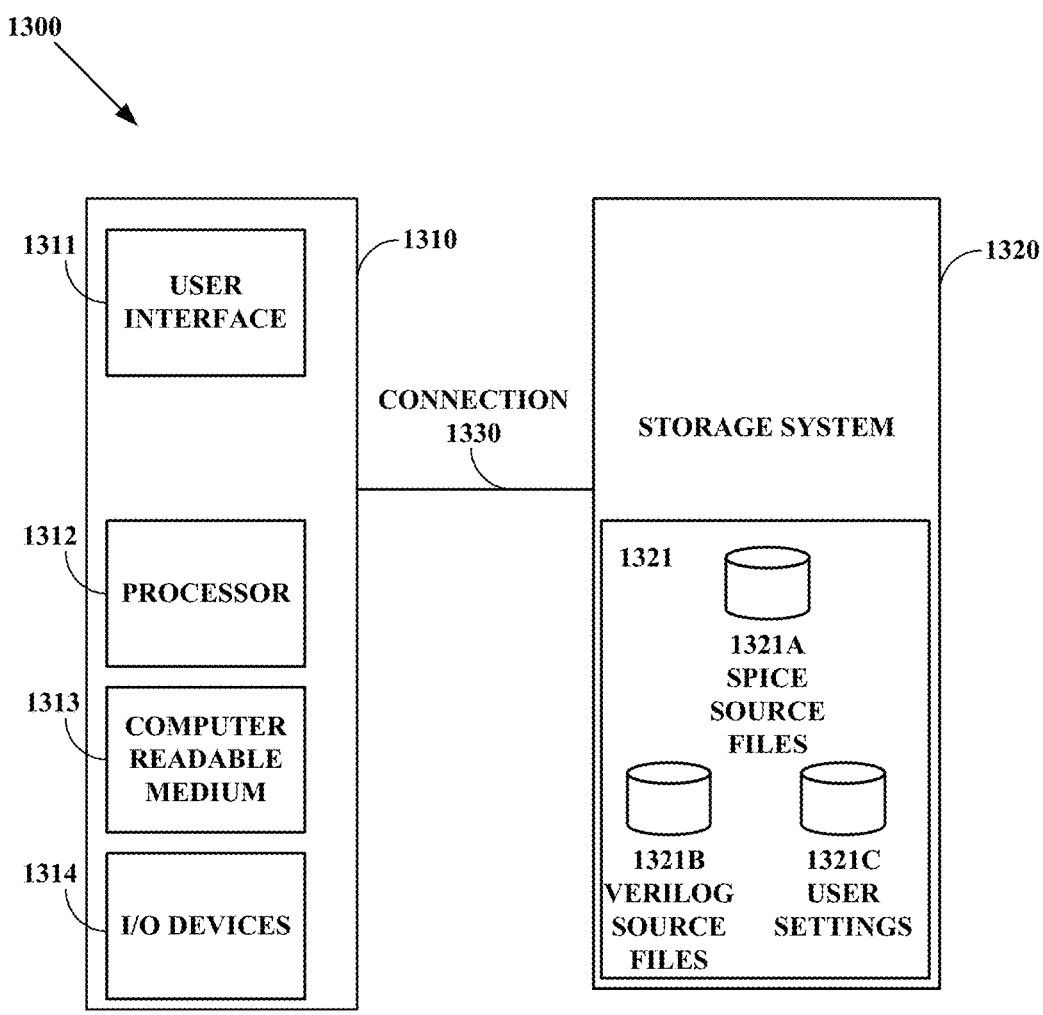
FIG. 13 is a block diagram of a circuit analysis system 1300, according to an embodiment.

FIG. 13 shows a block diagram of an exemplary circuit analysis system 1300, according to an embodiment. This system may provide simulator functionality for any of the methods described above. A user may access the system 1300 through a standalone client system, client-server environment, or a network environment. System 1300 may comprise one or more clients or servers 1310, one or more storage systems 1320, and a connection or connections 1330 between and among these elements.

Client 1310 may execute instructions stored on transitory or non-transitory computer readable medium 1313 with processor 1312, and may provide a user interface 1311 to allow a user to access storage system 1320. The instructions may be part of a software program or executable file that may operate electronic design automation (EDA) software. Client 1310 may be any computing system, such as a personal computer, workstation, mobile computer, or other device employing a processor which is able to execute programming instructions. User interface 1311 may be a GUI run in a user-controlled application window on a display. A user may interact with user interface 1311 through one or more input/output (I/O) devices 1314 such as a keyboard, a mouse, or a touch screen.

Storage system 1320 may take any number of forms, including but not limited to a server with one or more storage devices attached to it, a storage area network, or one or a plurality of non-transitory computer readable media. Databases 1321 may be stored in storage system 1320 such that they may be persistent, retrieved, or edited by the user. Databases 1321 may include SPICE source files 1321A, Verilog source files 1321B, and a user input database 1321C for example. These databases may be kept as separate files or systems, or may be merged together in any appropriate combination.

Only one client 1310 is shown connected to storage system 1320 through connection 1330, which may be a simple direct wired or wireless connection, a system bus, a network connection, or the like, to provide client 1310 with access to storage system 1320. In another aspect, connection 1330 may enable multiple clients 1310 to connect to storage system 1320. The connection may be part of a local area network, a wide area network, or another type of network, again providing one or more clients with access to storage system 1320. Depending on system administrator settings, client 1310's access to system storage 1320 or to other clients may be limited.

Figure 14:
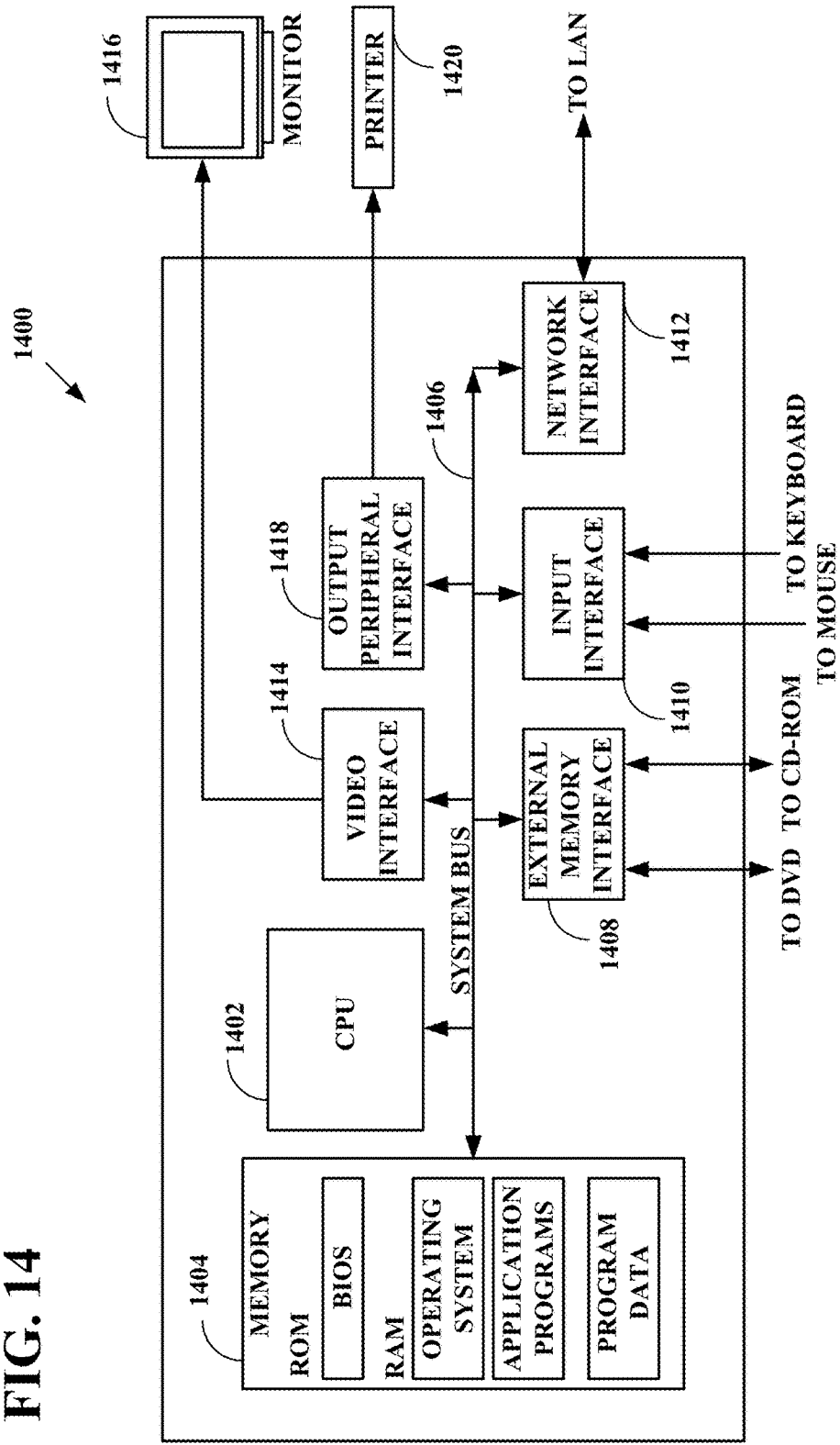
FIG. 14 is a diagram of a computer system 1400, according to an embodiment.

FIG. 14 depicts an exemplary computer system comprising the structure for implementation of the embodiments described above. Computer system 1400 comprises a central processing unit (CPU) 1402 that processes data stored in memory 1404 exchanged via system bus 1406. Memory 1404 typically includes read-only memory, such as a built-in operating system, and random-access memory, which may include an operating system, application programs, and program data. Computer system 1400 also comprises an external memory interface 1408 to exchange data with a DVD or CD-ROM for example. Further, input interface 1410 may serve to receive input from user input devices including but not limited to a keyboard and a mouse. Network interface 1412 may allow external data exchange with a local area network (LAN) or other network, including the internet. Computer system 1400 also typically comprises a video interface 1414 for displaying information to a user via a monitor 1416. An output peripheral interface 1418 may output computational results and other information to output devices including but not limited to a printer 1420.

Computer system 1400 may comprise for example a personal computer or an engineering workstation, each of which is widely known in the art and is commonly used for integrated circuit design tasks, along with software products commercially available for performing computer-aided integrated circuit design tasks. Computer system 1400 may also comprise a mobile computer, including for example a tablet computer or a smart phone. The computer system of FIG. 14 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

Appendix 1: SQL Metadata Tables

The following SQL code creates the detailed violation information to be located for a particular row in a table that shows less information. For example, a table that shows cumulative violation times aggregates multiple violations into a single row. A user may want a tool tip or detail panel to list all the contributing violations. Alternatively, there is a table that lists all violations no matter what kind of assert/check they come from. This has a limited number of columns because all asserts/checks have different kinds of information, but when a user moves a cursor over a row the user generally wants to see the full details for that particular check. The table resulting from the code is also provided.

```
CREATE TABLE detail_metadata (
   SourceTable TEXT NOT NULL,
   CheckType TEXT NOT NULL,
   SourceTableKeys TEXT NOT NULL,
   TargetTable TEXT NOT NULL,
   TargetTableKeys TEXT NOT NULL,
   PRIMARY KEY (SourceTableClass, CheckType)
);
INSERT INTO detail_metadata VALUES ('all_detail', 'assert',
'ErrId', 'Details', 'AssertErrId');
INSERT INTO detail_metadata VALUES ('all_detail ', 'dyn_dcpath',
'ErrId', 'dyn_dcpath_detail', 'DynDCPathErrId');
INSERT INTO detail_metadata VALUES ('all_detail', 'dyn_exi',
'ErrId', 'dyn_exi_detail', 'EXIErrId');
INSERT INTO detail_metadata VALUES ( 'all_detail', 'dyn_exrf',
'ErrId ', 'dyn_exrf_detail', 'EXRFErrId');
INSERT INTO detail_metadata VALUES ( 'all_detail', 'dyn_glitch',
'ErrId', 'dyn_glitch_detail', 'GlitchErrId');
INSERT INTO detail_metadata VALUES ('all_detail', 'dyn_highz',
'ErrId', 'dyn_highz_detail', 'DynHighZErrId');
INSERT INTO detail_metadata VALUES ('dyn_detail', 'dyn_dcpath',
'ErrId', 'dyn_dcpath_detail', 'DynDCPathErrId');
INSERT INTO detail_metadata VALUES ('dyn_detail ', 'dyn_exi',
'ErrId', 'dyn_exi_detail', 'EXIErrId');
INSERT INTO detail_metadata VALUES ('dyn_detail', 'dyn_exrf',
'ErrId', 'dyn_exrf_detail', 'EXRFErrId');
INSERT INTO detail_metadata VALUES ('dyn_detail ', 'dyn_glitch',
'ErrId', 'dyn_glitch_detail', 'GlitchErrId');
INSERT INTO detail_metadata VALUES (' dyn_detail', 'dyn_highz',
'ErrId', 'dyn_highz_detail'', 'DynHighZErrId');
INSERT INTO detail_metadata VALUES ('all_summary', 'assert',
'Id', 'Details', 'AssertId');
INSERT INTO detail_metadata VALUES ('all_summary', 'dyn_dcpath',
'Id, Expr/Inst/Net' , 'dyn_dcpath_detail', 'DynDCPathId,PathElements');
INSERT INTO detail_metadata VALUES ('all_summary', 'dyn_exi',
'Id, Expr/Inst/Net', 'dyn_exi_detail', 'EXIId, Element' );
INSERT INTO detail_metadata VALUES ('all_summary', 'dyn_exrf ',
'Id, Expr /Inst/Net' , 'dyn_ex rf detail', 'EXRFId, Node' );
INSERT INTO detail_metadata VALUES ('all_summary', 'dyn_glitch',
'Id, Expr/Inst/Net', 'dyn_glitch_detail', 'GlitchId, Node' );
INSERT INTO detail_metadata VALUES ('all_summary','dyn_highz ',
'Id, Expr/Inst/Net', 'dyn_highz_detail', 'DynHighZId, Node' );
INSERT INTO detail_metadata VALUES ('', 'DeviceAssertSummary',
'AssertId' , 'Details', 'AssertId');
INSERT INTO detail_metadata VALUES ('dyn_summary', 'dyn_dcpath',
'Id, Inst/Net', 'dyn_dcpath_detail', 'DynDCPathId, Path Elements');
INSERT INTO detail_metadata VALUES ('dyn_summary', 'dyn_exi',
'Id, Inst/Net', 'dyn_exi_detail', 'EXIId, Element');
INSERT INTO detail_metadata VALUES ('dyn_summary', 'dyn_exrf',
'Id,Inst/Net', 'dyn_exrf_detail', 'EXRFId,Node');
INSERT INTO detail_metadata VALUES ('dyn_summary', 'dyn_glitch',
'Id, Inst/Net ', 'dyn_glitch_detail', 'GlitchId, Node' );
INSERT INTO detail_metadata VALUES ('dyn_summary', 'dyn_highz',
'Id, Inst/Net ', 'dyn_highz_detail', 'DynHighZId, Node');
```

| detail_metadata: | | | | |
|---|---|---|---|---|
| SourceTable | CheckType | SourceTableKeys | TargetTable | TargetTableKeys |
| all_detail | assert | ErrId | Details | AssertErrId |
| all_detail | dyn_dcpath | ErrId | dyn_dcpath_detail | DynDCPathErrId |
| all_detail | dyn_exi | ErrId | dyn_exi_detail | EXIErrId |
| all_detail | dyn_exrf | ErrId | dyn_exrf_detail | EXRFErrId |
| all_detail | dyn_glitch | ErrId | dyn_glitch_detail | GlitchErrId |
| all_detail | dyn_highz | ErrId | dyn_highz_detail | DynHighZErrId |
| dyn_detail | dyn_dcpath | ErrId | dyn_dcpath_detail | DynDCPathErrId |
| dyn_detail | dyn_exi | ErrId | dyn_exi_detail | EXIErrId |
| dyn_detail | dyn_exrf | ErrId | dyn_exrf_detail | EXRFErrId |
| dyn_detail | dyn_glitch | ErrId | dyn_glitch_detail | GlitchErrId |
| dyn_detail | dyn_highz | ErrId | dyn_highz_detail | DynHighZErrId |
| all_summary | assert | Id, Expr/Inst/Net | Details | AssertId |
| all_summary | dyn_dcpath | Id, Expr/Inst/Net | dyn_dcpath_detail | DynDCPathId, PathElements |
| all_summary | dyn_exi | Id, Expr/Inst/Net | dyn_exi_detail | EXIId, Element |
| all_summary | dyn_exrf | Id, Expr/Inst/Net | dyn_ex rf detail | EXRFId, Node |
| all_summary | dyn_glitch | Id, Expr/Inst/Net | dyn_glitch_detail | Glitchid, Node |
| all_summary | dyn_highz | Id, Expr/Inst/Net | dyn_highz_detail | DynHighZId, Node |
|  | DeviceAssertSummary | AssertId | Details | AssertId |
| dyn_summary | dyn_dcpath | Id, Inst/Net | dyn_dcpath_detail | DynDCPathId, Path Elements |
| dyn_summary | dyn_exi | Id, Inst/Net | dyn_exi_detail | EXIId, Element |
| dyn_summary | dyn_exrf | Id, Inst/Net | dyn_exrf_detail | EXRFId,Node |
| dyn_summary | dyn_glitch | Id, Inst/Net | dyn_glitch_detail | GlitchId, Node |
| dyn_summary | dyn_highz | Id, Inst/Net | dyn_highz_detail | DynHighZId, Node |

Appendix 2: XML Metadata

In an alternate embodiment, metadata may be specified in the form of an XML database rather than a SQL database. The following example shows the metadata in XML format which:

Tells the design environment which tables are available to display.

Lists out the columns in each table. This feature allows users to create a filter built on top of one of the tables in the design environment's output setup before the simulation is run. For example, a user may set up a filter to count the number of dyn_exi violations on device M0, or to throw away all violations of less than 1 nsec in duration, or to find the violation with maximum duration, etc.

Annotates each column with a semantic type; this is an instance, net, or start time of the violation. The design environment can then cross-probe these values to a separate tool.

Allows GUI names to be used in place of the names in the SQL database.

```
<?xml version="1.0"?>
<!DOCTYPE note SYSTEM "metadata.dtd">
<data version="1.0">
<table>
   <name>all_detail</name>
   <guiname>All Asserts/Checks"</guiname>
<description>Reports all assert and check violations. Multiple violations of the same assert
or check are listed separately. </description>
   <column> <name>CheckName</name> <type>CHKNAME"</type> </column>
   <column> <name>Type</name> <type>CHKTYPE</type> </column>
   <column> <name>Expr/Inst/Net</name> <type>OBJ</type> </column>
   <column> <name>ObjectType</name> <type>OBJTYPE</type> </column>
   <column> <name>Start</name> <type>STARTTIME</type> </column>
   <column> <name>Duration</name> <type>DURATION</type> </column>
   <column> <name>ErrId</name> <type>ID</type> </column>
</table>
<table>
   <name>all_summary</name>
   <guiname>All Asserts/Checks (cumulative)</guiname>
   <description>Reports all assert and check violations. Multiple violations of the same
assert or check involving the same design object(s) are accumulated into a single
entry.</description>
   <column> <name>CheckName</name> <type>CHKNAME</type> </column>
   <column> <name>Type</name> <type>CHKTYPE</type> </column>
   <column> <name>Expr/Inst/Net</name> <type>OBJ</type> </column>
   <column> <name>ObjectType</name> <type>OBJTYPE</type> </column>
   <column> <name>Count</name> <type>COUNT</type> </column>
   <column> <name>FirstViolation</name> <type>REAL</type> </column>
   <column> <name>CumulativeDuration</name> <type>REAL</type> </column>
   <column> <name>Id</name> <type>ID</type> </column>
</table>
<table>
   <name>Details</name>
   <guiname>SOA Checks</guiname>
```

-continued

```
    <description>Reports all SOA Check violations. Multiple violations of the same check
are listed separately.</description>
    <column> <name>AssertInst</name> <type>CHKNAME</type> </column>
    <column> <name>Instance</name> <type>INST</type> </column>
    <column> <name>Message</name> <type>TEXT</type> </column>
    <column> <name>Model</name> <type>TEXT</type> </column>
    <column> <name>Expression</name> <type>TEXT</type> </column>
    <column> <name>MinBound</name> <type>REAL</type> </column>
    <column> <name>MaxBound</name> <type>REAL</type> </column>
    <column> <name>StartTime</name> <type>STARTTIME</type> </column>
    <column> <name>Value</name> <type>REAL</type> </column>
    <column> <name>Margin</name> <type>REAL</type> </column>
    <column> <name>Duration</name> <type>DURATION</type> </column>
    <column> <name>EndTime</name> <type>ENDTIME</type> </column>
    <column> <name>EndValue</name> <type>REAL</type> </column>
    <column> <name>PeakStep</name> <type>REAL</type> </column>
    <column> <name>PeakValue</name> <type>REAL</type> </column>
    <column> <name>DetailMessage</name> <type>TEXT</type> </column>
    <column> <name>AssertErrId</name> <type>ID</type> </column>
    <column> <name>AssertId</name> <type>ID</type> </column>
</table>
<table>
    <name>DeviceAssertSummary</name>
    <guiname>SOA Checks (cumulative)</guiname>
    <description>Reports all SOA Check violations. Multiple violations of the same check
involving the same design object(s) are accumulated into a single entry</description>
    <column> <name>AssertInst</name> <type>CHKNAME</type> </column>
    <column> <name>Instance</name> <type>INST</type> </column>
    <column> <name>Message</name> <type>TEXT</type> </column>
    <column> <name>Model</name> <type>TEXT</type> </column>
    <column> <name>Expression</name> <type>TEXT</type> </column>
    <column> <name>CumulativeDuration</name> <type>REAL</type> </column>
    <column> <name>CumulativePercentageDuration</name> <type>REAL</type>
</column>
    <column> <name>AssertId</name> <type>ID</type> </column>
</table>
<table>
    <name>dyn_detail</name>
    <guiname>Dynamic Checks</guiname>
    <description>Reports all Dynamic Check violations. Multiple violations of the same
check are listed separately.</description>
    <column> <name>CheckName</name> <type>CHKNAME</type> </column>
    <column> <name>Type</ name> <type>CHKTYPE</type> </column>
    <column> <name>Inst/Net</name> <type>OBJ</type> </column.>
    <column> <name>ObjectType</name> <type>OBJTYPE</type> </column>
    <column> <name>StartTime</name> <type>STARTTIME</type> </column>
    <column> <name>Duration</name> <type>DURATION</type> </column>
    <column> <name>ErrId</name> <type>ID</type> </column>
</table>
<table>
    <name>dyn_detail_full</name>
    <guiname>Dynamic Checks (detail)</guiname>
    <description>Reports all Dynamic Check violations. Multiple violations of the same
check are listed separately. Columns which are not relevant to a particular check will be
left blank. </description>
    <column> <name>CheckName</name> <type>CHKNAME</type> </column>
    <column> <name>Type</name> <type>CHKTYPE</type> </column>
    <column> <name>Node</name> <type>NET</type> </column>
    <column> <name>RiseFall</name> <type>TEXT</ty pe> </column>
    <column> <name>FromNode</name> <type>NET</type> </column>
    <column> <name>ToNode</name> <type>NET</type> </column>
    <column> <name>Element</name> <type>INST</type> </column>
    <column> <name>Start</name> <type>STARTTIME</type> </column>
    <column> <name>Duration</name> <type>DURATION</type> </column>
    <column> <name>PathElements</name> <type>TEXT</type> </colunm>
    <column> <name>MaxCurrent</name> <type>REAL</type> </column>
    <column> <name>Val</name> <type>REAL</type> </column>
    <column> <name>StaticVal</name> <type>REAL</type> </column>
    <column> <name>NetlistStatement</name> <type>TEXT</type> </column>
</table>
<table>
    <name>dyn_dcpath_detail"</name>
    <guiname>Dynamic DC Leakage Path Check</guiname>
    <description>Reports conductance paths between user-specified nets. Qualifying paths
carry an absolute current higher than parameter 'ith' for a time longer than the user-
specified 'duration'.</description>
    <column> <name>CheckName</name> <type>CHKNAME</type> </column>
    <column> <name>FromNode</name> <type>NET</type> </column>
    <column> <name>ToNode</name> <type>NET</type> </column>
```

```
    <column> <name>Start</name> <type>STARTTIME</type> </column>
    <column> <name>Duration</name> <type>DURATION</type> </column>
    <column> <name>PathElements</name> <type>TEXT</type> </column>
    <column> <name>DynDcPathid</name> <type>ID</type> </column>
    <column> <name>DynDCPathErrid</name> <type>ID</type> </column>
    <column> <name>Netlist Statement</name> <type>TEXT</type> </column>
</table>
<table>
    <name>dyn_exi_detail</name>
    <description>Reports elements and devices carrying currents (absolute value) higher than the current threshold (ith) for a time longer than the duration threshold (duration).</description>
    <guiname>Dynamic Excessive Element Current Check</guiname>
    <column> <name>CheckName</name> <type>CHKNAME</type> </column>
    <column> <name>Element</name> <type>INST</type> </column>
    <column> <name>Start</name><type>STARTTIME</type> </column>
    <column> <name>Duration</name> <type>DURATION</type> </column>
    <column> <name>MaxCurrent</name> <type>REAL</type> </column>
    <column> <name>EXIId</name> <type>ID</type> </column>
    <column> <name>EXIErrid</name> <type>ID</type> </column>
    <column> <name>NetlistStatement</name> <type>TEXT</type> </column>
</table>
<table>
    <name>dyn_exrf_detail</name>
    <guiname>Dynamic Excessive Rise, Fall, Undefined State Time Check</guiname>
    <description>Reports the nodes with excessive rise times, fall times, or with an undefined state.</description>
    <column> <name>CheckName</name> <type>CHKNAME</type> </column>
    <column> <name>Node</name> <type>NET</type> </column>
    <column> <name>RiseFall</name> <type>TEXT</type> </column>
    <column> <name>Start</name> <type>STARTTIME</type> </column>
    <column> <name>Duration</name> <type>DURATION</type> </column>
    <column> <name>EXRFid</name> <type>ID</type> </column>
    <column> <name>EXRFErrid</name> <type>ID</type> </column>;
    <column> <name>Netlist Statement</name> <type>TEXT</type> </column>
</table>
<table>
    <name>dyn_glitch_detail</name>
    <guiname>Dynamic Glitch Check</guiname>
    <description>A 'Glitch' occurs when a low signal goes above the mid-level, and crosses the mid-level again within the user defined duration, or a high signal goes below the mid-level, and crosses the mid-level again within the user-defined duration.</description>
    <column> <name>CheckName</name> <type>CHKNAME</type> </column>
    <column> <name>Node</name> <type>NET</type> </column>
    <column> <name>Start</name> <type>STARTTIME</type> </column>
    <column> <name>Duration"</name> <type>DURATION</type> </column>
    <column> <name>Val</name> <type>REAL</type> </column>
    <column> <name>StaticVal</name> <type>REAL</type> </column>
    <column> <name>GlitchId</name> <type>ID</type> </column>
    <column> <name>GlitchErrid</name> <type>ID</type> </column>
    <column> <name>NetlistStatement</name> <type>TEXT</type> </column>
</table>
<table>
    <name>dyn_highz_detail</name>
    <guiname>Dynamic HighZ Node Check</guiname>
    <description>Reports the nodes that are in high impedance state for a duration longer than the user-defined threshold. A high impedance state is reached when there is no DC path from the node to any power supply or ground.</description>
    <column> <name>addColumn(CheckName</name> <type>CHKNAME</type> </column>
    <column> <name>addColumn(Node</name> <type>NET</type> </column>
    <column> <name>addColumn(Start</name> <type>STARTTIME</type> </column>
    <column> <name>addColumn(Duration</name> <type>DURATION</type> </column>
    <column> <name>addColumn(DynHighZid</name> <type>ID</type> </column>
    <column> <name>addColumn(DynHighZErrId</name> <type>ID</type> </column>
    <column> <name>addColumn(NetlistStatement</name> <type>TEXT</type> </column>
</table>
<table>
    <name>dyn_summary</name>
    <guiname>Dynamic Checks (cumulative)</guiname>
    <description>Reports all Dynamic Check violations. Multiple violations of the same check involving the same design object(s) are accumulated into a single entry.</description>
    <column> <name>CheckName</name> <type>CHKNAME</type> </column>
    <column> <name>Type</name> <type>CHKTYPE</type> </column>
    <column> <name>Inst/Net</name> <type>OBJ</type> </column>
    <column> <name>ObjectType</name> <type>OBJTYPE</type> </column>
    <column> <name>Count</ name> <type>COUNT</type> </column>
```

```
<column> <name>FirstViolation</name> <type>REAL</type> </column>
<column> <name>CumulativeDuration</name> <type>REAL</type> </column>
<column> <name>id</name> <type>id</type> </column>
</table>
</data>
```

What is claimed is:

1. A processor-implemented method for viewing analog simulation check violations in an electronic design automation framework, the method comprising:

using a processor:
- normalizing a plurality of simulator-generated data tables of violation data, wherein the normalizing includes generating additional data tables that include details of the check violations;
- combining the plurality of normalized simulator-generated data tables into a single data table for each check type using Structured Query Language (SQL) inner join operations;
- creating a virtual data table of the single data table to list individual check violations; and
- outputting, to a display, the virtual data table for user inspection of the corresponding check violations, wherein results from the inspection of the corresponding check violations are to be used to assist the user in debugging of the electronic design.

2. The processor-implemented method of claim 1, wherein the details include at least one of circuit nodes, elements, and paths that are implicated in the check violations.

3. The processor-implemented method of claim 1, further comprising creating additional virtual data tables that combine virtual data tables of different check types into unified summary tables.

4. The processor-implemented method of claim 1, further comprising at least one of sorting and filtering virtual data table columns according to content of the virtual data table columns.

5. The processor-implemented method of claim 1, further comprising:
- creating a second virtual data table of the single data table to aggregate individual check violations that involve a same circuit at different points in time; and
- outputting the second virtual data table for user inspection of the corresponding check violations.

6. The processor-implemented method of claim 1, wherein the virtual data table is self-describing to enable a single graphical user interface to operate across multiple simulators and simulator versions.

7. The processor-implemented method of claim 1, further comprising generating metadata tables that describe (i) types of data presented in various columns of the virtual data table and additional virtual data tables and (ii) allowed user interactions with at least one of the virtual data table and the additional virtual data tables.

8. A non-transitory computer readable medium storing instructions that, when executed by a processor, perform a method for viewing analog simulation check violations in an electronic design automation framework, the processor-implemented method comprising:
- normalizing a plurality of simulator-generated data tables of violation data, wherein the normalizing includes generating additional data tables that include details of the check violations;
- combining the plurality of normalized simulator-generated data tables into a single data table for each check type using Structured Query Language (SQL) inner join operations;
- creating a virtual data table of the single data table to list individual check violations; and
- outputting, to a display, the virtual data table for user inspection of the corresponding check violations, wherein results from the inspection of the corresponding check violations are to be used to assist the user in debugging of the electronic design.

9. The non-transitory computer readable medium of claim 8, wherein the details include at least one of circuit nodes, elements, and paths that are implicated in the check violations.

10. The non-transitory computer readable medium of claim 8, further comprising instructions for creating additional virtual data tables that combine virtual data tables of different check types into unified summary tables.

11. The non-transitory computer readable medium of claim 8, further comprising instructions for at least one of sorting and filtering virtual data table columns according to content of the virtual data table columns.

12. The non-transitory computer readable medium of claim 8, further comprising instructions for:
- creating a second virtual data table of the single data table to aggregate individual check violations that involve a same circuit object at different points in time; and
- outputting the second virtual data table for user inspection of the corresponding check violations.

13. The non-transitory computer readable medium of claim 8, wherein the virtual data table is self-describing to enable a single graphical user interface to operate across multiple simulators and simulator versions.

14. The non-transitory computer readable medium of claim 8, further comprising instructions for generating metadata tables that describe (i) types of data presented in various columns of the virtual data table and additional virtual data tables and (ii) allowed user interactions with at least one of the virtual data table and the additional virtual data tables.

15. A system for viewing analog simulation check violations in an electronic design automation framework, comprising:
- a memory storing executable instructions; and
- a processor executing instructions to:
  - normalize a plurality of simulator-generated data tables of violation data wherein the normalizing includes generating additional data tables that include details of the check violations;
  - combine the plurality of normalized simulator-generated data tables into a single data table for each check type using Structured Query Language (SQL) inner join operations;
  - create a virtual data table of the single data table to list individual check violations; and
  - output, to a display, the virtual data table for user inspection of the corresponding check violations, wherein results from the inspection of the corresponding check violations are to be used to assist the user in debugging of the electronic design.

16. The system of claim 15, wherein the details include at least one of circuit nodes, elements, and paths that are implicated in the check violations.

17. The system of claim 15, further comprising creating additional virtual data tables that combine virtual data tables of different check types into unified summary tables.

18. The system of claim 15, further comprising instructions to:
  create a second virtual data table of the single data table to aggregate individual check violations that involve a same circuit object at different points in time; and
  output the second virtual data table for user inspection of the corresponding check violations.

19. The system of claim 15, wherein the virtual data table is self-describing to enable a single graphical user interface to operate across multiple simulators and simulator versions.

20. The system of claim 15, further comprising generating metadata tables that describe (i) types of data presented in various columns of the virtual data table and additional virtual data tables and (ii) allowed user interactions with at least one of the virtual data table and the additional virtual data tables.

\* \* \* \* \*